(12) United States Patent
Schretlen et al.

(10) Patent No.: US 11,055,269 B2
(45) Date of Patent: Jul. 6, 2021

(54) EFFICIENT INGEST AND SEARCH OF ACCESS CONTROLLED RECORDS

(71) Applicant: GroupBy Inc., Toronto (CA)

(72) Inventors: Peter Schretlen, Toronto (CA); Roland Gossage, Toronto (CA)

(73) Assignee: GroupBy Inc.

( * ) Notice: Subject to any disclaimer, the term of this patent is extended or adjusted under 35 U.S.C. 154(b) by 259 days.

(21) Appl. No.: 16/114,882

(22) Filed: Aug. 28, 2018

(65) Prior Publication Data

US 2020/0073974 A1   Mar. 5, 2020

Related U.S. Application Data

(60) Provisional application No. 62/550,892, filed on Aug. 28, 2017.

(51) Int. Cl.
| | |
|---|---|
| G06F 16/245 | (2019.01) |
| G06F 16/22 | (2019.01) |
| H04L 29/06 | (2006.01) |
| G06F 16/2453 | (2019.01) |

(52) U.S. Cl.
CPC ...... *G06F 16/2272* (2019.01); *G06F 16/2453* (2019.01); *H04L 63/101* (2013.01)

(58) Field of Classification Search
None
See application file for complete search history.

(56) References Cited

U.S. PATENT DOCUMENTS

| | | | | |
|---|---|---|---|---|
| 7,792,791 | B2* | 9/2010 | Smolen | G06F 16/2308 707/609 |
| 10,432,669 | B1* | 10/2019 | Badhwar | H04L 63/0263 |
| 2002/0186260 | A1* | 12/2002 | Young | G06F 21/604 715/853 |
| 2014/0041053 | A1* | 2/2014 | Edwards | G06F 21/6218 726/28 |
| 2014/0282910 | A1* | 9/2014 | Palmer | G06F 16/9535 726/4 |

* cited by examiner

*Primary Examiner* — Son T Hoang
(74) *Attorney, Agent, or Firm* — Gowling WLG (Canada) LLP (57) ABSTRACT

Large data sets that use ACLS can be efficiently ingested into a search index and subsequently searched. The ingestion may replace the ACLS of records with virtual ACL nodes that are common to a number of individual records, and a virtual ACL node to ACL entities index is provided for use in searching the records with the virtual ACL nodes.

14 Claims, 8 Drawing Sheets

EFFICIENT INGEST AND SEARCH OF ACCESS CONTROLLED RECORDS

TECHNICAL FIELD

The current specification relates generally to the ingestion, and subsequent searching, of access controlled records.

BACKGROUND

Online purchasing portals targeting business to business (B2B) transactions may include large catalogs of available products for purchase. Depending upon the requirements of the portals, each item in a catalog may have different accessibility to different users. As an example, a seller of a particular gadget may allow particular customers or members to view and purchase the gadget, while other customers or members may not be able to view and/or purchase the gadget. For a B2B ecommerce portal, different customers may have access to different products, as well as possibly different prices for the products. In other applications, documents or records may only be accessed by certain users. In these types of applications, access to the particular data, whether the data is related to the availability of a product, a product's price, sensitive documents, or other types of data, may be controlled on a per-user basis.

Access to an individual piece of data may be controlled by associating with the data a list of users allowed to access the data. Such a list may often be referred to as an Access Control List (ACL). When a particular user attempts to access the piece of data, the associated ACL can be checked to determine if the user is authorized to access the data, and assuming the user is on the ACL, the access can proceed.

Associating ACLS with data allows control over the access to the data; however, as the number of pieces of data grow, along with the number of ACLs and individuals that may be on an ACL grow, the ingestion and indexing of the information may require an undesirably long amount of time to process.

SUMMARY

Implementations of the current disclosure are directed to systems and methods that allow large data sets that use ACLs to be efficiently ingested into a search index and subsequently searched. The implementations replace the ACLs of records with virtual ACL nodes that are common to a number of individual records, and a virtual ACL node to ACL entities index is provided for use in searching the records with the virtual ACL nodes.

In accordance with the present disclosure there is provided a system comprising: one or more processors; and one or more computer readable memories coupled to the one or more processors, the one or more computer readable memories having instructions stored thereon, which when executed by the one or more processors configure the system to: receive a plurality of records each comprising record data and an associated access control list (ACL) specifying one or more authorized entities that are authorized to access the associated record data; splitting the respective ACL from the data record for each of the plurality of records; optimize the split ACLs; combine and index the optimized stripped ACLs with the plurality of stripped data records into a first index; and index the optimized stripped ACLs into a second index.

In accordance with the present disclosure there is further provided a method comprising: receiving a plurality of records each comprising record data and an associated access control list (ACL) specifying one or more authorized entities that are authorized to access the associated record data; splitting the respective ACL from the data record for each of the plurality of records; optimizing the split ACLs; combining and indexing the optimized stripped ACLs with the plurality of stripped data records into a first index; and indexing the optimized stripped ACLs into a second index.

In accordance with the present disclosure there is further provided a method comprising: receiving a query including an access control list (ACL) filter; determining one or more virtual ACL nodes associated with the ACL filter from an index of virtual ACL nodes and ACL entities; transforming the received query using the one or more determined virtual ACL nodes; and querying an index of records and virtual ACL nodes using the transformed query.

In accordance with the present disclosure there is further provided a system comprising: one or more processors; and one or more computer readable memories coupled to the one or more processors, the one or more computer readable memories having instructions stored thereon, which when executed by the one or more processors configure the system to: receive a plurality of records each comprising record data and an associated access control list (ACL) specifying one or more authorized entities that are authorized to access the associated record data; generate one or more virtual ACL nodes based on individual ACLs, wherein a virtual ACL node comprises at least one authorized entity common to a plurality of individual ACLs; indexing the one or more generated virtual ACL nodes with the at least one authorized entity of the respective virtual ACL; indexing the plurality of records with the one or more virtual ACL nodes.

BRIEF DESCRIPTION OF THE DRAWINGS

Features, aspects and advantages of the present disclosure will become better understood with regard to the following description and accompanying drawings in which.

DETAILED DESCRIPTION

In order to quickly search large data sets, the information is indexed to allow fast retrieval of the information. When ingesting a large data set, for example a million data records, which may have different access rights associated with different ones of a hundred thousand different users, the amount of time to index the data set may be undesirably long. In order to efficiently ingest these types of data sets, the records that each include record data and associated access control lists (ACLs) specifying entities authorized to access the record data, are split into the record data and ACL. The split ACLs are optimized into a smaller number of optimized ACLs and then recombined with the data records. The data records with the optimized ACLs may then be indexed. The optimized ACLs are indexed separately in order to allow a mapping between the original ACLs, or at least the individual entities on the original ACLs, and the optimized ACLs for searching. By replacing the original ACLs, which may have a large number of individual entities on each ACL that need to be indexed, with the optimized ACLs before indexing, fewer index values are required. The systems and methods described provide for faster ingestion of the data sets; however, the querying may be slower as a result of having to first map an ACL entity of a search to an optimized ACL; however, this additional time is minimal versus the potentially large time savings possible on ingesting data.

Figure 1:
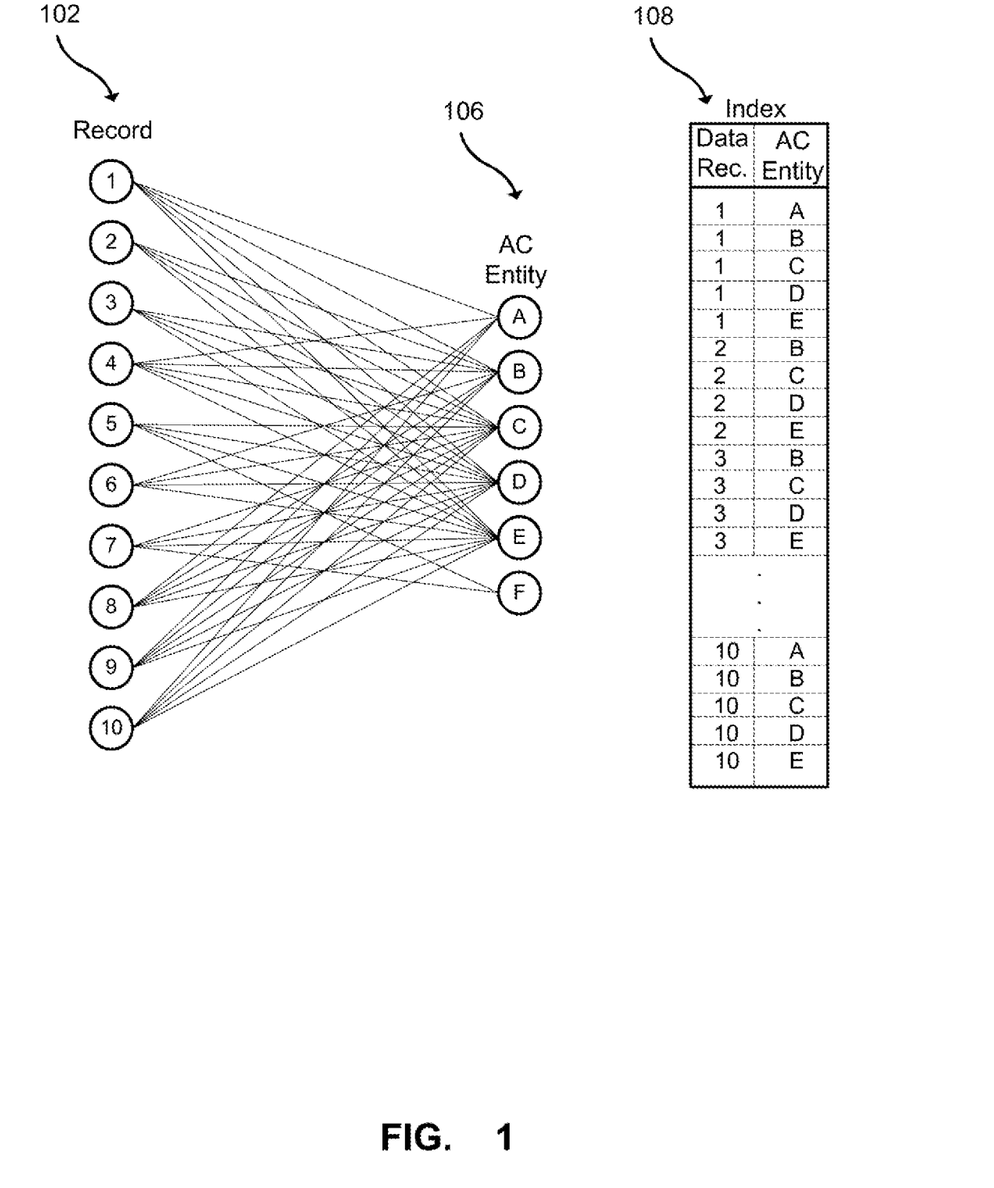
FIG. 1 depicts a bipartite representation of a large data set with ACLs and corresponding indexed values.

FIG. 1 depicts a bipartite representation of a large data set with ACLs and corresponding indexed values. The bipartite graph depicted in FIG. 1 is a graph of an example data set depicted in Table 1. As depicted in Table 1, a particular record may be associated with a piece of record data, which may be the actual desired data, a reference to the desired data, a hash of the desired data, etc., and an ACL specifying the entities authorized to access the record and its data. The entities are depicted by letters 'A', 'B', 'C', 'D', 'E' and 'F' and may represent individual users and/or groups of users. As depicted entities 'A', 'B', 'C', 'D', and 'E' are able to access the data of records 1, 4, 8, 9, 10. Entities 'B', 'C', 'D', and 'E' are able to access the data of records 2, 3, and 6. Entities 'C', 'D', 'E'0 and 'F' are able to access the data of records 5 and 7.

TABLE 1

Example ACL data records

| Record | Data | ACL |
|---|---|---|
| 1 | 90144fcc | A, B, C, D, E |
| 2 | 901453f0 | B, C, D, E |
| 3 | 901455da | B, C, D, E |
| 4 | 9014576a | A, B, C, D, E |
| 5 | 90145cf6 | C, D, E, F |
| 6 | 90145ddc | B, C, D, E |
| 7 | 90145ea4 | C, D, E, F |
| 8 | 90145f76 | A, B, C, D, E |
| 9 | 9014603e | A, B, C, D, E |
| 10 | 90146106 | A, B, C, D, E |

The bipartite graph of FIG. 1 depicts graphically the records 102 that are able to be accessed by particular access control (AC) entities 106. A link between a record 102 and an AC entity 106 represents the ability of the particular AC entity to access the particular data record. In order to quickly search the data records while adhering to the ACLs, each link between a record and AC entity can be indexed, depicted in FIG. 1 as Index 108. As is apparent, the number of values, or record:AC entity pairs, to be indexed depends on the number of records and the number of different AC entities that are able to access each record. As depicted in FIG. 1 the Index 108 may index 45 different individual values. As the number of records and the length of individual ACLs increase, the indexing time to ingest the data can increase to undesirable lengths. It is noted that the length of an ACL reflects the number of individual entities on the ACL. For example, the ACL of record 1 in Table 1 may be considered as having a length of '5' and the length of the ACL of record 2 in Table 1 may be '4'.

As described further below, in order to reduce the amount of time required to ingest and index large ACL'd data sets, the records are processed in order to split each record into the data portion and the ACL portion. The split ACLs are processed in order to optimize, or at least reduce, the number of ACLs and their associated lengths by replacing ACLs or portions of ACLs with a virtual ACL node which is mapped to the ACLs or portions of ACLs it is replacing. The virtual ACL nodes are combined with the split data portions which are then indexed. The mapping of the replaced ACLs or portions of ACLs to virtual ACL nodes is indexed for use in subsequent searching. By replacing the ACLs with virtual ACL nodes, the number of values required to be indexed can be significantly reduced, which in turn can reduce the time required to ingest and index the data.

Figure 2:
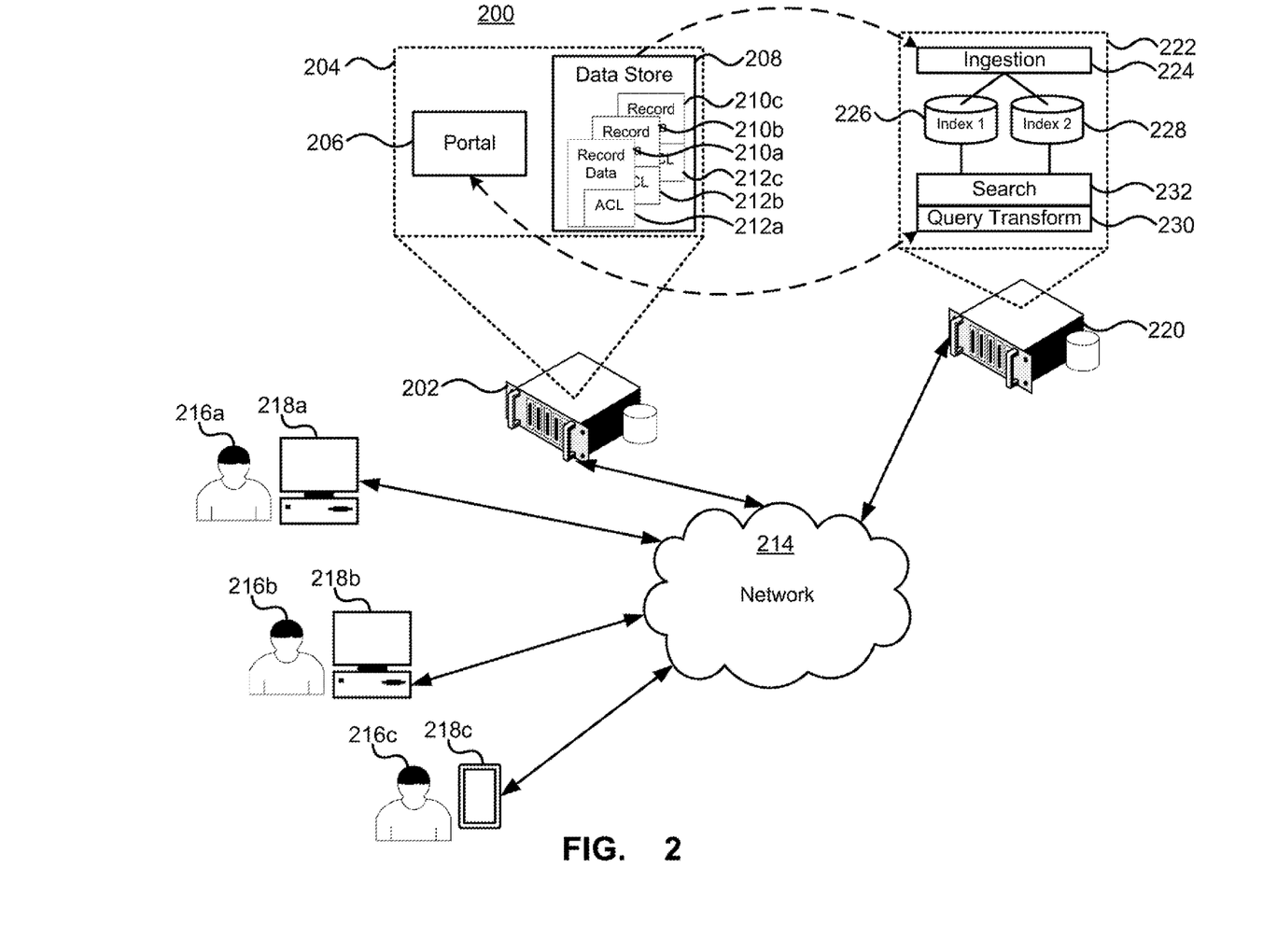
FIG. 2 depicts a system for efficiently ingesting and searching data sets with ACLs.

FIG. 2 depicts a system for efficiently ingesting and searching data sets with ACLs. The system 200 is described in relation to a business-to-business (B2B) ecommerce portal for products. The portal comprises a large number of products that are offered for sale and a large number of customers that each have different contracts defining what products can be viewed, purchased and possibly the price of the products. ACL lists can be used to ensure that customers are able to view, and purchase the appropriate products at the appropriate price. The B2B ecommerce portal may be provided by one or more servers 202 that provide the required functionality 204 for providing the ecommerce portal 206. The functionality may include portal functionality 204 that broadly provides the ecommerce portal as well as a data store 208 that stores the product catalogue information, access information, as well as possibly other data required by the portal functionality 206. The data store may store the individual records 210a, 210b, 210c and the associated ACL data 212a, 212b, 212c. Although the catalogue data store is depicted as being stored at the portal server 202, the catalogue data may be stored by third parties.

The portal server 202 is connected, via a network 214 such as the Internet, to one or more customer computing devices 218a, 218b, 218c. As depicted, the computing devices may include desktop computers 218a, 218b, tablet devices 218c or other computing devices that are similarly capable of providing an interface to a customer 216a, 216b, 216c to interact with the ecommerce portal functionality 204. Each of the users 216a, 216b, 216c may be an individual or group of people and may be associated with an identifier that can be used in the ACLs to identifying the customer.

The portal functionality 204 may allow a customer to search through the data store, which should be done in accordance with ACLs. In order to efficiently search the data store, the data records and associated ACLs are indexed. The indexing, and subsequent searching, is depicted as being performed by one or more separate search servers 220 that provides ingestion, indexing and searching functionality 222, however, the functionality need not be provided as separate functionality and may alternatively be provided within the portal functionality. Regardless of the particular servers implementing the ingestion, indexing and searching functionality 222, the functionality includes ingestion functionality that receives each of the data records with their respective ACLs, and processes the ACLs to improve the indexing speed of the records, without greatly impacting the searching speed. The processing splits the data from the ACLs and reduces the length of ACLs using virtual ACLs. The virtual ACLs, and possibly short ACLs, may then be recombined with the data records and indexed into a first data index 226. The mapping of ACLs to virtual ACLs is also indexed in a second ACL index 228. The ingestion functionality that improves the ingestion speed for large ACL'd may be provided on top of existing searching functionality and use the existing searching functionalities indexing in order to index the optimized ACL data from the ingestion functionality.

When a user searches the catalogue for a product, or data record, the search will include an indication of the customer's AC entity performing the search. The search query is provided to query transformation functionality 230 that uses the second ACL index mapping ACLs, and the AC entities on each ACL, to their corresponding virtual ACL node(s) to replace the customer's AC entity with an appropriate virtual ACL node and then the transformed query can be executed by search engine functionality 232 to retrieve those records associated with the appropriate virtual ACL nodes.

As described above, the ingestion, indexing and searching functionality 222 replaces long ACL lists with virtual ACL nodes for faster indexing of the records. An index of the ACLs to virtual ACL nodes is generated to allow subsequent transformation of search queries to filter records on the virtual ACL nodes associated with the indexed records rather than the AC entities of the customers performing the search.

Figure 3:
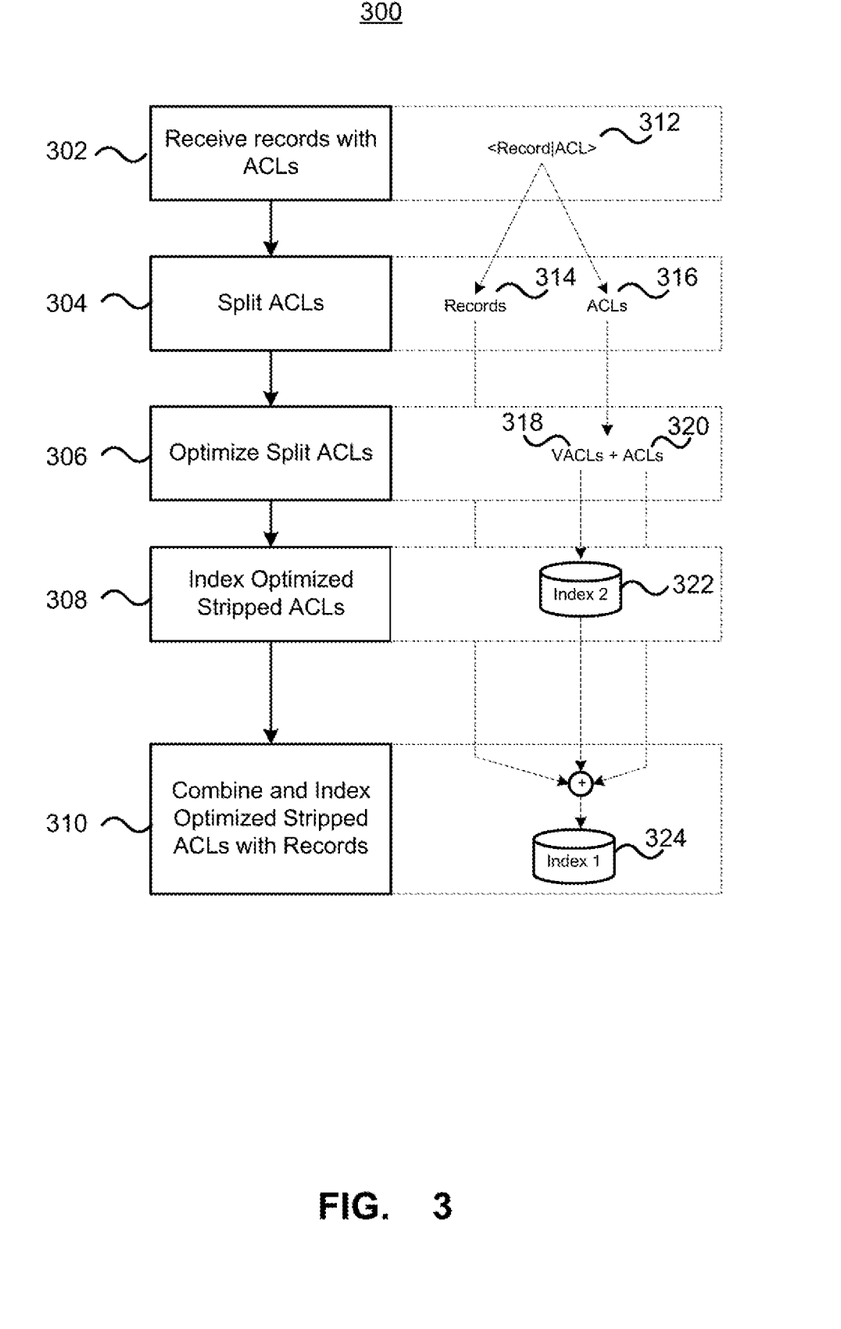
FIG. 3 depicts a method for efficiently ingesting data with associated ACLs.

FIG. 3 depicts a method for efficiently ingesting data with associated ACLs. The method 300 receives a plurality of records with ACLs (302). The number of records received may be from a few thousand to hundreds of thousands, millions, tens of millions, hundreds of millions or more. Each record is associated with an ACL specifying one or more entities authorized to access the record. The number of possible entities may be from a few hundred to hundreds of thousands or more and the length of ACLs may range from having a single entity listed to listing every entity. The record 312 is depicted as being specified by '<Record|ACL>'; however, an actual record may be specified any number of different ways. A further representation of a record may be, for example:

```
1.  {
2.      "title"     :   "Product XYZ",
3.      "price"     :   1.00,
4.      "visibleTo"     ["A","L","X"]
5.  }
```

In the above example, the visibleTo field is the ACL, which specifies that entities 'A', 'L' and 'X', which may be for example companies, are able to view and purchase product XYZ for $1.00.

Once the records are received, or as the records are being received, the ACLs and data records are split (304) from each other resulting in respective records of data 314 and corresponding ACLs 316. The split ACLs 316 are optimized (306) which results in shortening of long ACLs and replacing the ACLs with virtual ACL nodes (VACLs) 318. In optimizing the split ACLs, some ACLs may not be replaced with virtual ACL nodes, for example if the ACL specifies a single entity, there may be no benefit in replacing the ACL with a virtual ACL node. Accordingly, the optimization of the split ACLs may result in a number of virtual ACLs 318 that will replace ACLs, along with ACLs 320 that will not be replaced. The optimized stripped ACLs are indexed (308), or more particularly, the virtual ACL nodes are indexed to provide an efficient mapping from a virtual ACL node to the ACLs, or AC entities the virtual ACL node replaced. The virtual ACL node index 322 may be used in transforming a query for a particular AC entity to corresponding virtual ACL nodes. The virtual ACL nodes, along with any ACLs that were not replaced with a virtual ACL node are then combined with the split data records and indexed (310) into a search index 324.

There are a number of possible techniques for optimizing the split ACLs. However, broadly the goal of the optimization process is to replace long ACLs with short virtual ACL nodes to speed the indexing. However, if each ACL were replaced with a corresponding new virtual ACL node for each AC entity on the original ACL, the search time could grow unacceptably large as a result of the required query transformation. One technique is to identify all identical ACLs and using a single virtual ACL node to replace each of the identical ACLs. Using the ACLs of Table 1 as an example, could result in the virtual ACL node assignment depicted in Table 2 and Table 3.

TABLE 2

Record to virtual ACL node

| Record | ACL/VACL |
|--------|----------|
| 1      | V1       |
| 2      | V2       |
| 3      | V2       |
| 4      | V1       |
| 5      | V3       |
| 6      | V2       |
| 7      | V3       |
| 8      | V1       |
| 9      | V1       |
| 10     | V1       |

TABLE 3

VACL to ACL mapping

| VACL | ACL        |
|------|------------|
| V1   | A, B, C, D, E |
| V2   | B, C, D, E |
| V3   | C, D, E, F |

Figure 4:
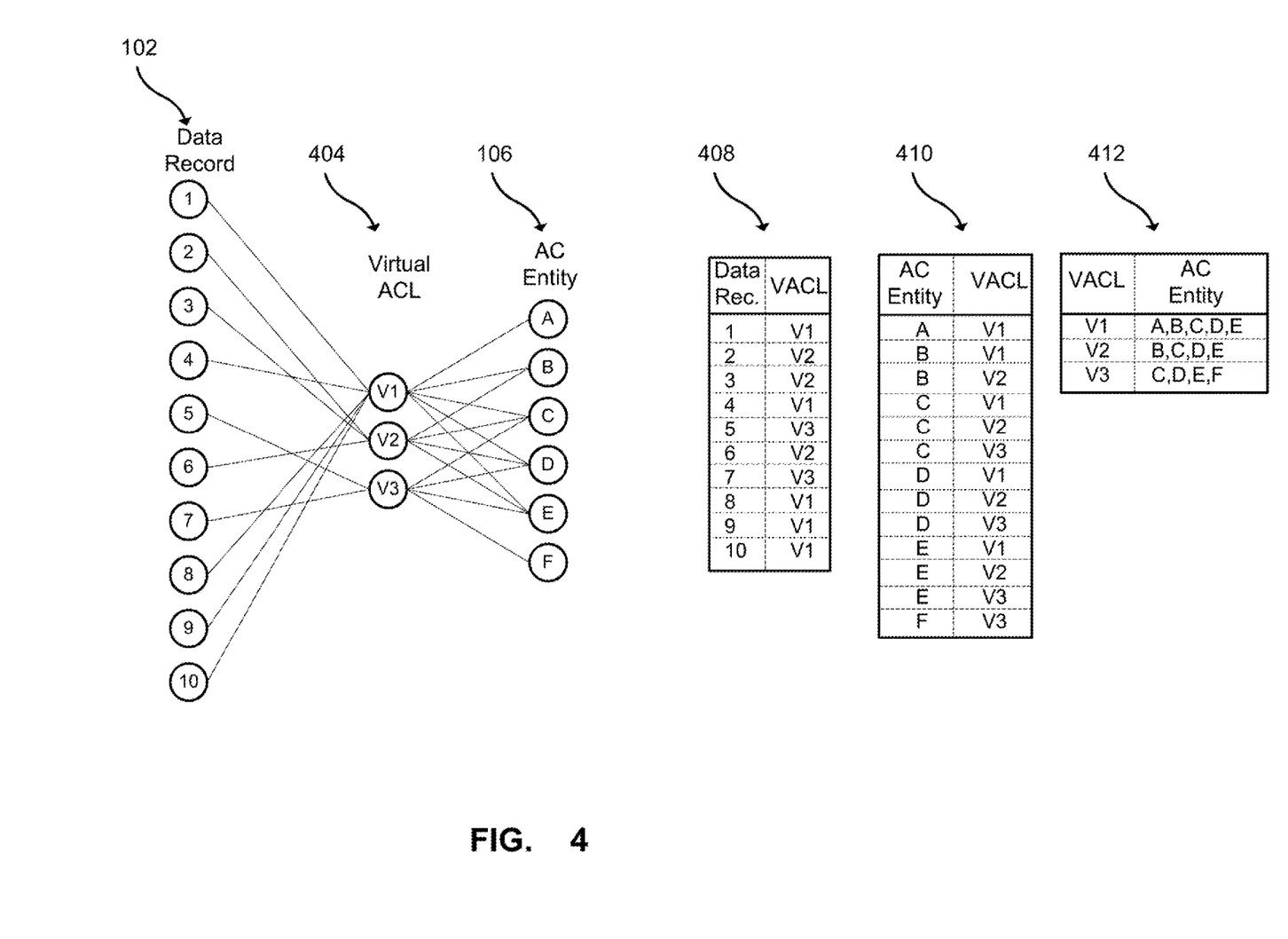
FIG. 4 depicts a bipartite representation of a large data set with ACLs and corresponding indexed values using virtual ACL nodes.

The above example is depicted graphically in FIG. 4, which depicts a further bipartite representation of a large data set with ACLs and corresponding indexed values using virtual ACL nodes. As depicted, the same data records 102 are linked to the same AC entities 106. However the link is through the virtual ACL nodes 404. The first index 408 depicts the record and virtual ACL index while the other indexes 410, 412 provide a mapping from the AC entities or ACLs to the corresponding virtual ACL nodes.

The above described optimization technique can be performed relatively quickly during ingestion however may result in more virtual ACL nodes being used than necessary. For example, an improved virtual node assignment is depicted in Tables 4 and 5, which identifies common portions of ACLs, rather than entire ACLs, which can result in fewer values being indexed in the virtual ACL node to ACL mappings at the expenses of additional processing during ingestion to identify the best virtual node to AC entities assignment.

TABLE 4

Record to virtual ACL node

| Record | ACL/VACL |
|---|---|
| 1 | V1 |
| 2 | V2 |
| 3 | V2 |
| 4 | V1 |
| 5 | V3 |
| 6 | V2 |
| 7 | V3 |
| 8 | V1 |
| 9 | V1 |
| 10 | V1 |

TABLE 5

VACL to ACL mapping

| VACL | ACL |
|---|---|
| V4 | A, B |
| V5 | B |
| V6 | F |
| V7 | C, D, E |

Figure 5:
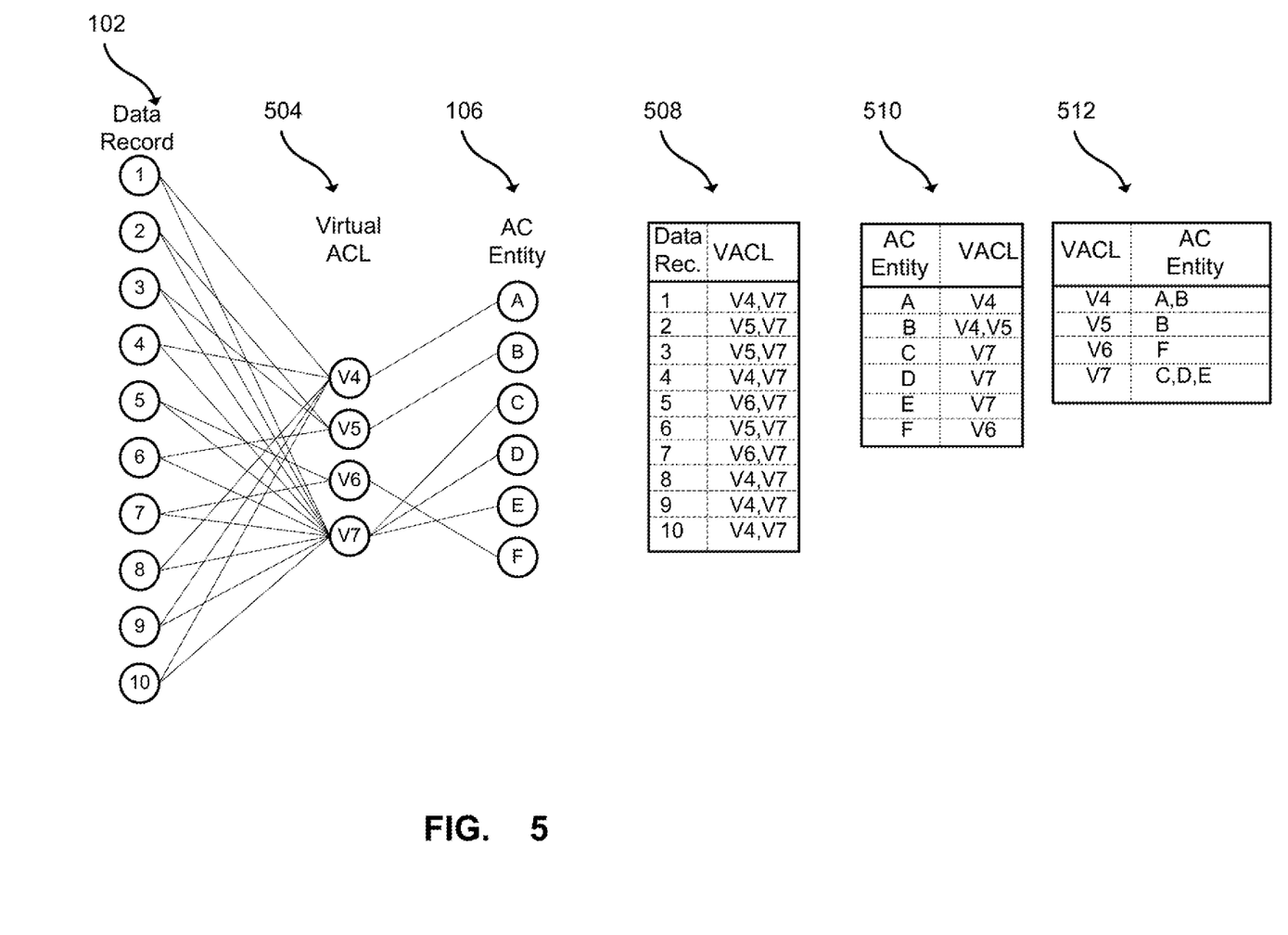
FIG. 5 depicts a further bipartite representation of a large data set with ACLs and corresponding indexed values using virtual ACL nodes.

The above example is depicted graphically in FIG. 5, which depicts a further bipartite representation of a large data set with ACLs and corresponding indexed values using virtual ACL nodes. As depicted, the same data records 102 are linked to the same AC entities 106. However the link is through the virtual ACL nodes 504. Although there are more virtual ACL nodes in the example, each is relatively short, resulting in fewer values needing to be indexed. The first index 508 depicts the record and virtual ACL index while the other indexes 510, 512 provide a mapping from the AC entities or ACLs to the corresponding virtual ACL nodes.

Figure 6:
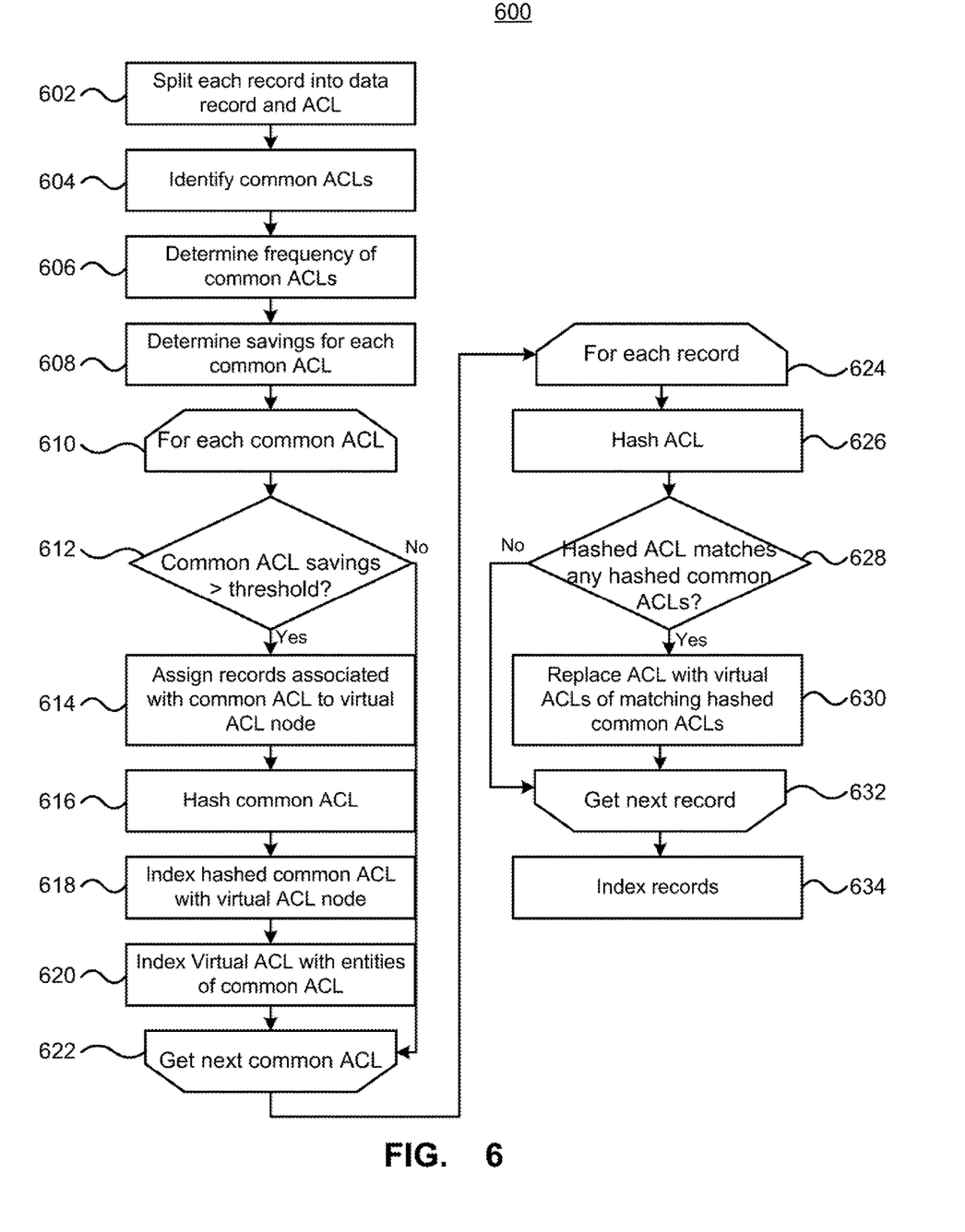
FIG. 6 depicts a further method for efficiently ingesting data with associated ACLs.

FIG. 6 depicts a further method for efficiently ingesting data with associated ACLs. The method 600 receives the data records with associated ACLs and splits each record into a data record and corresponding ACL record (602). Common ACLs, or common portions of ACLs, are identified (604) and the frequency of occurrence of the identified common ACL, or common portions of ACLs, within the split ACL records is determined (606), and a savings metric is determined for each common ACL (608). The savings metric provides an indication of the impact on the indexing time replacing common ACL with a virtual ACL node would have. The savings metric may be provided by (frequency of common ACL)*(Length of common ACL−1). That is the impact on indexing is related to the number of values needed to be indexed, which in turn depends on the number of AC entities on the common ACL and how many records the common ACL is associated with. As an example, if an ACL of 'A','B', 'C', 'D', which has a length of 4 and is associated with for example 3 records, the savings by replacing the length 4 ACL with a virtual ACL node having a length of 1 would be (3)*(4−1)=9. Once the savings metric is determined for the common ACLs, they may be ordered from highest savings to lowest savings and then for each common ACL (610) it is determined if the common ACL's savings metric is greater than a particular threshold value (612). The threshold value may be a value that indicates it is worthwhile to replace the common ACL with the virtual ACL node. If the common ACL's saving metric is greater than the threshold (yes at 612), the common ACL is replaced with the virtual ACL node in all of the records in which the common ACL occurs (614). The common ACL may be hashed (616) and indexed with the virtual ACL node (618). The virtual ACL node and the individual entities of the common ACL are also indexed (620) and the next most common ACL retrieved (622) for processing in a similar manner. Assuming that the common ACLs were ordered from highest to lowest savings metric, if the common ACL savings metric is not above the threshold value (No at 612), then no further common ACLs will be above the threshold and processing of the ACLs can end and the method proceed to processing the data records in order to replace the original ACLs with the optimized ACLs.

For each of the data records (624), the associated ACL is hashed (626) and it is determined if the hashed ACL matches any of the hashed common ACLs (628). If no match is found (No at 628), and so the record's ACL was not replaced with a virtual ACL node, the next record is retrieved (632) and processed. If the hashed ACL does match (Yes at 628) the record's ACL is replaced with the virtual ACL node associated with the hashed common ACL (630). Once all of the records have been processed the records, with the optimized ACLs may be indexed (634). The index of virtual ACL node and entities of the common ACL may then be used when searching records in order to translate an entity to a virtual ACL node.

Figure 7:
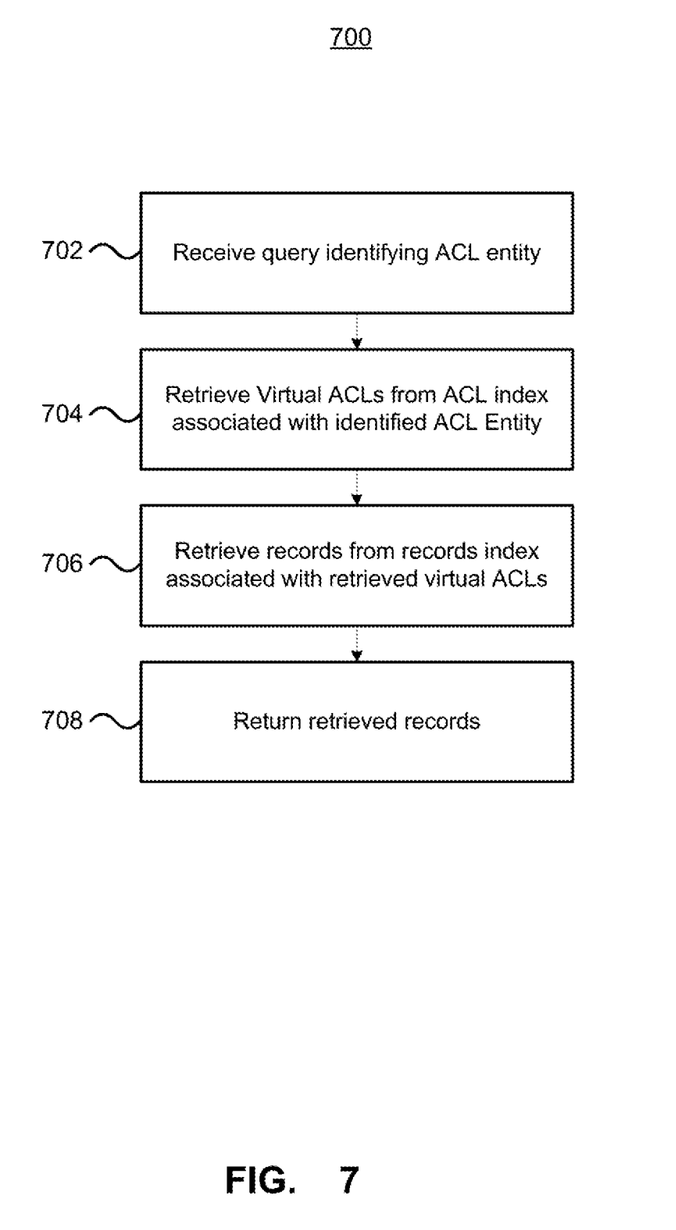
FIG. 7 depicts a method for searching a data set ingested in accordance with the method of FIG. 7.

FIG. 7 depicts a method for searching a data set ingested in accordance with the method of FIG. 6. The method 700 receives a query identifying an AC entity (702). The virtual ACLs associated with the AC entity are retrieved from the virtual ACL node index (704) generated during the ACL optimization of the ingestion process. The search query is transformed to search for the retrieved virtual ACL nodes. The query transformation may replace the AC entity with the virtual ACL nodes, or it may add the virtual ACL nodes to the AC entity since the AC entity may not have been replaced in every record's ACL. Once the AC entity has been transformed using the virtual ACL node information, the records associated with virtual ACL nodes, and possibly the AC entity, are retrieved (706) and returned (708).

Figure 8:
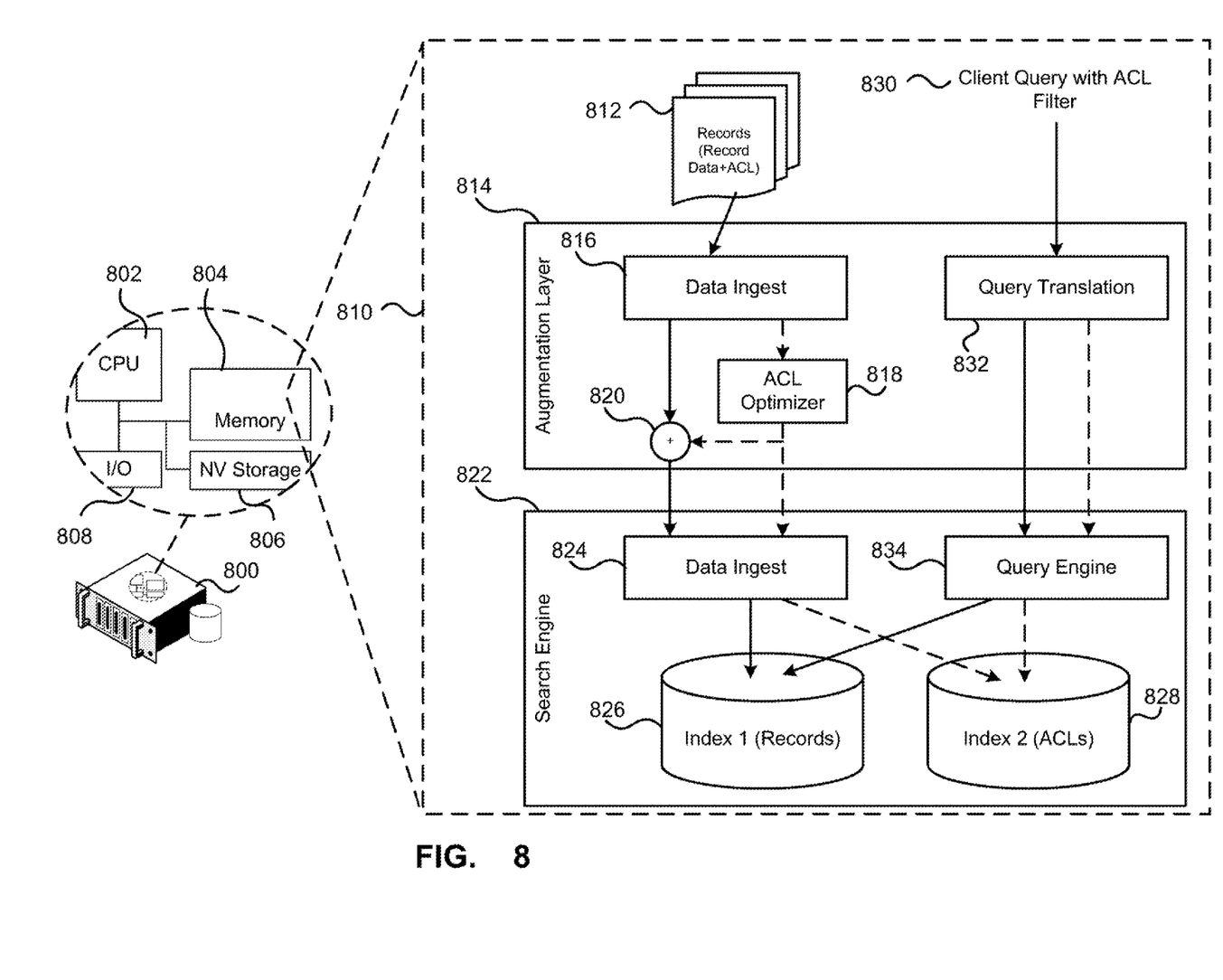
FIG. 8 depicts components a search system configured for efficient ingestion and searching of data sets with ACLs.

FIG. 8 depicts components of a search system configured for efficient ingestion and searching of data sets with ACLs. In FIG. 8 the solid arrows indicate the data record processing and querying, while the dashed arrows represent the ACL processing and querying. The system 800 is depicted as a single physical server; however, the functionality described may be provided across multiple servers. The server 800 comprises at least processing unit 802 and associated memory 804 that stores instructions. The server may also comprise non-volatile storage 806, as well as one or more input/output (I/O) interfaces 808 that allow additional components, whether internal or external to the server, to be operatively connected to the processing unit 802.

The memory 804 stores data and instructions, which when executed by the processing unit 802 configure the server to provide ingestion, indexing and searching functionality 810. The functionality 810 may include search engine functionality 822 that provides searching and indexing functionality as well as an augmentation layer 814 that provides the improved ingestion and indexing described above as well as the query transformation functionality 832 for the efficient searching of the ingested records. The search engine functionality may use an existing search engine, with the augmentation layer provided in addition to the search engine. The augmentation layer 814 may include data ingestion functionality 816 for processing the received records 812 in order to split the ACLs from the records. The split ACL records may be provided to ACL optimization functionality 818 which optimizes the ACLs as described above. The optimized ACLs may be provided to the search engine, and in particular to a data ingestion component 824 which may index the ACL information 828 as described above. The augmentation layer 814 may further include record combining functionality 820 for combining the split record data with the optimized ACL data. The combined records with optimized ACLs may be provided to the search engine's data ingest functionality for indexing into a records index 826.

When a client query is received with an ACL filter 830, query transformation functionality 832 of the augmentation layer 814 can access the ACL index 828 through the search engine's query engine functionality 834. The query transformation uses the received ACL information to replace, or augment, the ACL filter with the optimized ACLs. The updated client query can then be sent to the search engine's query engine 834 for retrieving the appropriate records from the records index 826.

As described above, by replacing long ACLs with virtual ACL nodes prior to indexing records, it is possible to reduce the time required for ingestion. Various tests were performed indexing the same data set using different numbers of virtual ACL nodes. The results are depicted in Table 6. As depicted, the more ACL nodes used, the faster the data was indexed. However, as depicted in Table 7, when searching for records of the indexed data, the search times slowed as the number of virtual nodes increased.

TABLE 6

Indexing speed for different numbers of virtual ACL nodes

| # of Virtual ACL Nodes | Approx. # of Indexed Values | Approximate Indexing Time |
| --- | --- | --- |
| 0 | 770M | 400 minutes |
| 226 | 160M | 85 minutes |
| 909 | 110M** | 60 minutes |

**Includes other, non-ACL record optimizations of 30M indexed values.

TABLE 7

Query time for different number of virtual ACL nodes

| # of Virtual ACL Nodes | Query Size (# filter clauses) | Approximate Query Time |
| --- | --- | --- |
| 0 | 0 | 267 ms |
| 226 | 193 | 687 ms |
| 909 | 657 | 1,590 ms |

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor to implement one, more or all of the steps of the described method or methods.

In various embodiments devices and nodes described herein are implemented using one or more components or modules to perform the steps corresponding to one or more methods, for example, has generation, transmitting, processing, and/or receiving steps. Thus, in some embodiments various features are implemented using components or modules. Such components or modules may be implemented using software, hardware or a combination of software and hardware. In some embodiments each component or module is implemented as an individual circuit with the device or system including a separate circuit for implementing the function corresponding to each described component or module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and/or associated hardware, to perform one or more or all of the steps of the above-described method(s). Some embodiments are directed to a device including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Various features in the present disclosure relate to a technical problem of how to improve indexing speed for ACL data sets. Various features in the present disclosure relate to a technical problem of how to improve indexing speed for ACL data sets while maintaining acceptable searching speeds.

What is claimed is:

1. A method comprising:
ingesting a plurality of records comprising:
receiving a plurality of records each comprising record data and an associated access control list (ACL) specifying one or more authorized entities that are authorized to access the record data;
slitting the received plurality of records into data portions comprising the record data, and ACL portions comprising the ACLs;
optimizing the ACL portions to generate a plurality of virtual ACL nodes each specifying a plurality of authorized entities from the authorized entities of the received plurality of records, wherein the optimizing comprises:
identifying all identical ACLs of the received ACLs, and
replacing each of the identical ACLs with a single virtual ACL node;
combining the data portions and the optimized ACL portions by replacing respective authorized entities of the ACL portions with corresponding virtual ACL nodes having the same respective authorized entities;
generating an index of the combined data portions and optimized ACL portions based at least on the plurality of virtual ACL nodes; and
querying the plurality of ingested records comprising:
receiving a query including an ACL filter specifying an entity;
determining one or more virtual ACL nodes specifying the entity of the ACL filter from the index;
transforming the received query by replacing the entity specified in the query with the determined one or more virtual ACL nodes;
querying the index using the transformed query; and
returning at least one of the plurality of ingested records matching the index in response to the received query.

2. The method of claim 1, wherein the generating the index comprises:
indexing a first mapping between the respective authorized entities and the corresponding virtual ACL nodes; and
indexing a second mapping between the corresponding virtual ACL nodes and the respective authorized entities specified on the corresponding virtual ACL nodes.

3. The method of claim 1, wherein the optimizing the ACL portions comprises replacing authorized entities of the plurality of authorized entities common to records of the plurality of received records with the single virtual ACL node.

4. The method of claim 3, comprising; determining a processing savings by replacing the authorized entities of the plurality of authorized entities common to the records of the plurality of received records with the single virtual ACL node.

5. The method of claim 4, wherein the authorized entities of the plurality of authorized entities common to the records of the plurality of received records are replaced with the single virtual ACL node if the processing savings is above a threshold value.

6. The method of claim 3, further comprising:
hashing the common authorized entities that have been replaced by the single virtual ACL node; and
indexing the hashed common authorized entities and the single virtual ACL node that replaced the common authorized entities.

7. The method of claim 6, the replacing the respective authorized entities of the ACL portions with the corresponding virtual ACL nodes comprises:
hashing the respective authorized entities of the ACL portions;
using the hashed authorized entities to determine a corresponding indexed virtual ACL node; and
replacing the hashed authorized entities with the corresponding indexed virtual ACL node.

8. A system comprising:
one or more processors; and
one or more computer readable memories coupled to the one or more processors, the one or more computer readable memories having instructions stored thereon, which when executed by the one or more processors configure the system to:
ingest a plurality of records comprising:
receiving a plurality of records each comprising record data and an associated access control list (ACL) specifying one or more authorized entities that are authorized to access the record data;
slitting the received plurality of records into data portions comprising the record data, and ACL portions comprising the ACLs;
optimizing the ACL portions to generate a plurality of virtual ACL nodes each specifying a plurality of authorized entities from the authorized entities of the received plurality of records, wherein the optimizing comprises:
identifying all identical ACLs of the received ACLs, and
replacing each of the identical ACLs with a single virtual ACL node;
combining the data portions and the optimized ACL portions by replacing respective authorized entities of the ACL portions with corresponding virtual ACL nodes having the same respective authorized entities;
generating an index of the combined data portions and optimized ACL portions based at least on the plurality of virtual ACL nodes; and
query the plurality of ingested records comprising:
receiving a query including an ACL filter specifying an entity;
determining one or more virtual ACL nodes specifying the entity of the ACL filter from the index;
transforming the received query by replacing the entity specified in the query with the determined one or more virtual ACL nodes;
querying the index using the transformed query; and
returning at least one of the plurality of ingested records matching the index in response to the received query.

9. The system of claim 8, wherein the generating the index comprises:
indexing a first mapping between the respective authorized entities and the corresponding virtual ACL nodes; and
indexing a second mapping between the corresponding virtual ACL nodes and the respective authorized entities specified on the corresponding virtual ACL nodes.

10. The system of claim 8, wherein the optimizing the ACL portions comprises replacing authorized entities of the plurality of authorized entities common to records of the plurality of received records with the single virtual ACL node.

11. The system of claim 10, comprising: determining a processing savings by replacing the authorized entities of the plurality of authorized entities common to the records of the plurality of received records with the single virtual ACL node.

12. The system of claim 8, wherein the authorized entities of the plurality of authorized entities common to the records of the plurality of received records are replaced with the single virtual ACL node if the processing savings is above a threshold value.

13. The system of claim 10, further comprising:
- hashing the common authorized entities that have been replaced by the single virtual ACL node; and
- indexing the hashed common authorized entities and the single virtual ACL node that replaced the common authorized entities.

14. The system of claim 13, the replacing the respective authorized entities of the ACL portions with the corresponding virtual ACL nodes comprises:
- hashing the respective authorized entities of the ACL portions;
- using the hashed authorized entities to determine a corresponding indexed virtual ACL node; and
- replacing the hashed authorized entities with the corresponding indexed virtual ACL node.

* * * * *